(12) United States Patent
Lucka et al.

(10) Patent No.: US 11,714,019 B2
(45) Date of Patent: Aug. 1, 2023

(54) SYSTEMS AND METHODS FOR MAKE-UP AIR BLOCKING VALVE WITH A RESTRICTIVE POPPET ORIFICE

(71) Applicant: DAYCO IP HOLDINGS, LLC, Roseville, MI (US)

(72) Inventors: Kevin W. Lucka, Southfield, MI (US); Donald P. Tinsley, III, Huntington Woods, MI (US); Matthew C. Gilmer, South Lyon, MI (US); Aaron Diamond, Alpwna, MI (US); Nathan Tuskan, Howell, MI (US)

(73) Assignee: Dayco IP Holdings, LLC, Roseville, MI (US)

( * ) Notice: Subject to any disclaimer, the term of this patent is extended or adjusted under 35 U.S.C. 154(b) by 0 days.

(21) Appl. No.: 17/814,899

(22) Filed: Jul. 26, 2022

(65) Prior Publication Data
US 2023/0030351 A1    Feb. 2, 2023

Related U.S. Application Data

(60) Provisional application No. 63/203,540, filed on Jul. 27, 2021.

(51) Int. Cl.
*G01M 3/02*     (2006.01)
*F16K 1/38*     (2006.01)
(Continued)

(52) U.S. Cl.
CPC .......... *G01M 3/025* (2013.01); *F01M 11/10* (2013.01); *F01M 13/0011* (2013.01);
(Continued)

(58) Field of Classification Search
CPC .... G01M 3/025; G01M 3/2815; F01M 11/10; F01M 13/0011; F01M 2250/00; F02M 25/06; F16K 1/38; F16K 31/0655
(Continued)

(56) References Cited

U.S. PATENT DOCUMENTS 5,603,483 A  *  2/1997  Reuter ................ F16K 31/0655
                                                        251/210
6,810,909 B2 *  11/2004  Herbert .............. F16K 31/0693
                                                        137/596.17
(Continued)

OTHER PUBLICATIONS

International Search Report and Written Opinion, PCT/US2022/074128, dated Nov. 1, 2022, 9 pages.

*Primary Examiner* — Hoang M Nguyen
(74) *Attorney, Agent, or Firm* — FisherBroyles, LLP; Susan M. Oiler

(57) ABSTRACT

Valves, internal combustion engines including such valves, and methods of on-board diagnostic leak detection for a crankcase ventilation system using such valves are disclosed. Each valve has a housing defining a first port and a second port in fluid communication with one another and defining a valve seat therebetween. A biasing member biases a poppet sealing member into a normally open position (defining unrestricted flow through the valve) and a commanded actuator is connected to the poppet sealing member. The poppet sealing member has an orifice therethrough defining a restricted flow path, and, upon command, the commanded actuator moves the poppet sealing member from the open position to a restricted flow position in which the poppet sealing member is seated against the valve seat for restricted flow thorough the orifice in the poppet sealing member.

18 Claims, 8 Drawing Sheets

Open, Unrestricted Flow Path

(51) Int. Cl.
*F16K 31/06* (2006.01)
*F01M 11/10* (2006.01)
*F02M 25/06* (2016.01)
*F01M 13/00* (2006.01)
*G01M 3/28* (2006.01)

(52) U.S. Cl.
CPC ............... *F02M 25/06* (2013.01); *F16K 1/38* (2013.01); *F16K 31/0655* (2013.01); *G01M 3/2815* (2013.01); *F01M 2250/00* (2013.01)

(58) Field of Classification Search
USPC .......................................... 137/596.1, 596.17
See application file for complete search history.

(56) References Cited

U.S. PATENT DOCUMENTS

| | | | |
|---|---|---|---|
| 10,533,584 B1* | 1/2020 | Zähe | F16K 17/105 |
| 11,015,498 B2* | 5/2021 | Martin | F16K 17/12 |
| 2008/0203347 A1* | 8/2008 | Burrola | F02M 63/023 |
| | | | 251/284 |
| 2009/0250021 A1* | 10/2009 | Zarrabi | F02M 51/0614 |
| | | | 123/90.11 |
| 2019/0331249 A1* | 10/2019 | Borja | F16K 1/44 |
| 2021/0215264 A1* | 7/2021 | Fletcher | F16K 27/0209 |

\* cited by examiner

SYSTEMS AND METHODS FOR MAKE-UP AIR BLOCKING VALVE WITH A RESTRICTIVE POPPET ORIFICE

RELATED APPLICATIONS

This application claims the benefit of U.S. Provisional Application No. 63/203,540, filed Jul. 27, 2021, which is incorporated herein by reference in its entirety.

TECHNICAL FIELD

This application relates to A Make-Up Air Blocking Valve (MUABV) that is designed to primarily close and restrict flow to perform a leak diagnostic on the crankcase ventilation system. The valve is located between the air duct or air box in the air induction system and the make-up air tube connecting to the valve cover.

BACKGROUND

In the past, in automotive engines, on/off operation of a vacuum generator and/or accessory was controlled by a gate valve in which a rigid gate was deployed across a conduit to stop the flow of a fluid (in this exemplary application, air) through the valve. Within automated or "commanded" valves, the gate is typically actuated by a solenoid and opened or closed in response to an electrical current applied to the solenoid coil. These solenoid-powered gate valves also tend to include a coil spring, diaphragm, or other biasing element which biases the gate towards an unpowered, 'normally open' or 'normally closed' position.

This was improved upon in Applicant's co-owned U.S. Pat. No. 10,830,197 to a three-member gate valve with improved sealing engagement with a conduit yet requiring a smaller solenoid to move the gate valve linearly within the pocket of the conduit.

The pressure in an engine crankcase is ideally maintained near atmospheric pressure (ATM pressure+/−5 kPa) and must meet emissions regulations from the EPA, CARB, etc. for gasoline powered vehicles. To meet these regulations, it is desirable to be able to detect any leak, disconnected lines, or breaks in the crankcase ventilation system (path from fresh air to the manifold, including all flow passageways and passageway connections) to ensure crankcase gasses are appropriately managed to avoid excessive pollutants being discharged into the atmosphere.

In order to achieve these conditions, there is a need for a valve, especially a more compact and easily manufacturable valve, which is normally open allowing free flow (minimal restriction) of air into the crankcase and can be switched to a restricted flow in order to conduct a pressure integrity or diagnostic check (and not create an excessively negative pressure in the crankcase).

SUMMARY

In a first aspect, valves are disclosed that have a housing defining a first port and a second port in fluid communication with one another and defining a valve seat therebetween, that have a biasing member biasing a poppet sealing member into a normally open position (unrestricted flow through the valve), and a commanded actuator connected to the poppet sealing member. The poppet sealing member has an orifice therethrough defining a restricted flow path through the valve, and, upon command, the commanded actuator moves the poppet sealing member from the open position to a restricted flow position in which the poppet sealing member is seated against the valve seat for restricted flow thorough the orifice in the poppet sealing member. The commanded actuator can include a solenoid housed within the housing. The housing defines a plug or plug receptacle in electrical communication with the solenoid.

In all aspects, the solenoid can be over-molded with a plastic material that defines a first housing part of the housing, which has a mouth configured for spin welding to a second housing part. In all aspects, the biasing member can be a coil spring.

In all aspects, the poppet sealing member can be bell-shaped. The poppet sealing member has a bottom sealing surface defining a mouth of the bell-shaped poppet sealing member, and the bottom sealing surface is a curved surface of a cone, when viewed in a longitudinal cross-section of the valve, oriented radially upward and outward relative to a head of the poppet sealing member.

In all aspects, the orifice can be oriented perpendicular to the central longitudinal axis of the poppet sealing member and can be oriented to face the second port.

In all aspects, the first port can be formed of a plastic material and, when viewed in a longitudinal cross-section, comprises a generally U-shaped, V-shaped, or J-shaped mouth configured for spin-welding. The housing can be a two-part housing that is spin-welded together. The commanded actuator comprises a solenoid and the solenoid is over-molded with a plastic material that defines a first housing part of the two-part housing.

In another aspect, crankcase ventilation breach detection systems of an internal combustion engine are disclosed that include an internal combustion engine having a crankcase and an intake manifold, a crankcase ventilation tube in fluid communication with air from an air intake and the blow-by-gas, a valve as described above that controls fluid flow through the crankcase ventilation tube, and a pressure sensor positioned between the valve and the crankcase. During operation of the internal combustion engine, detection of no pressure differential by the pressure sensor during restricted flow through the valve indicates a breach in the system.

The system can also include a positive crankcase ventilation valve in fluid communication between the crankcase and intake manifold to regulate the flow of blow-by-gas from the crankcase to the intake manifold. The internal combustion engine can have a turbocharger and the crankcase ventilation tube can connect upstream of the compressor of the turbocharger.

In all aspects, the valve is commanded to move to the restricted flow position once per key cycle under idle conditions of the internal combustion engine.

In all aspects, the system can implement a method of on-board diagnostic leak detection for a crankcase ventilation system. The method includes commanding the valve to move the poppet sealing member to the restricted flow position for a pre-selected time period, monitoring measurements from the pressure senor before and during the pre-selected time period, and comparing the before and during measurements for detection of a leak in the system. The method can also include stopping the commanding step and allowing the biasing member to move the poppet sealing member to the unrestricted flow position.

DETAILED DESCRIPTION

Figure 1:
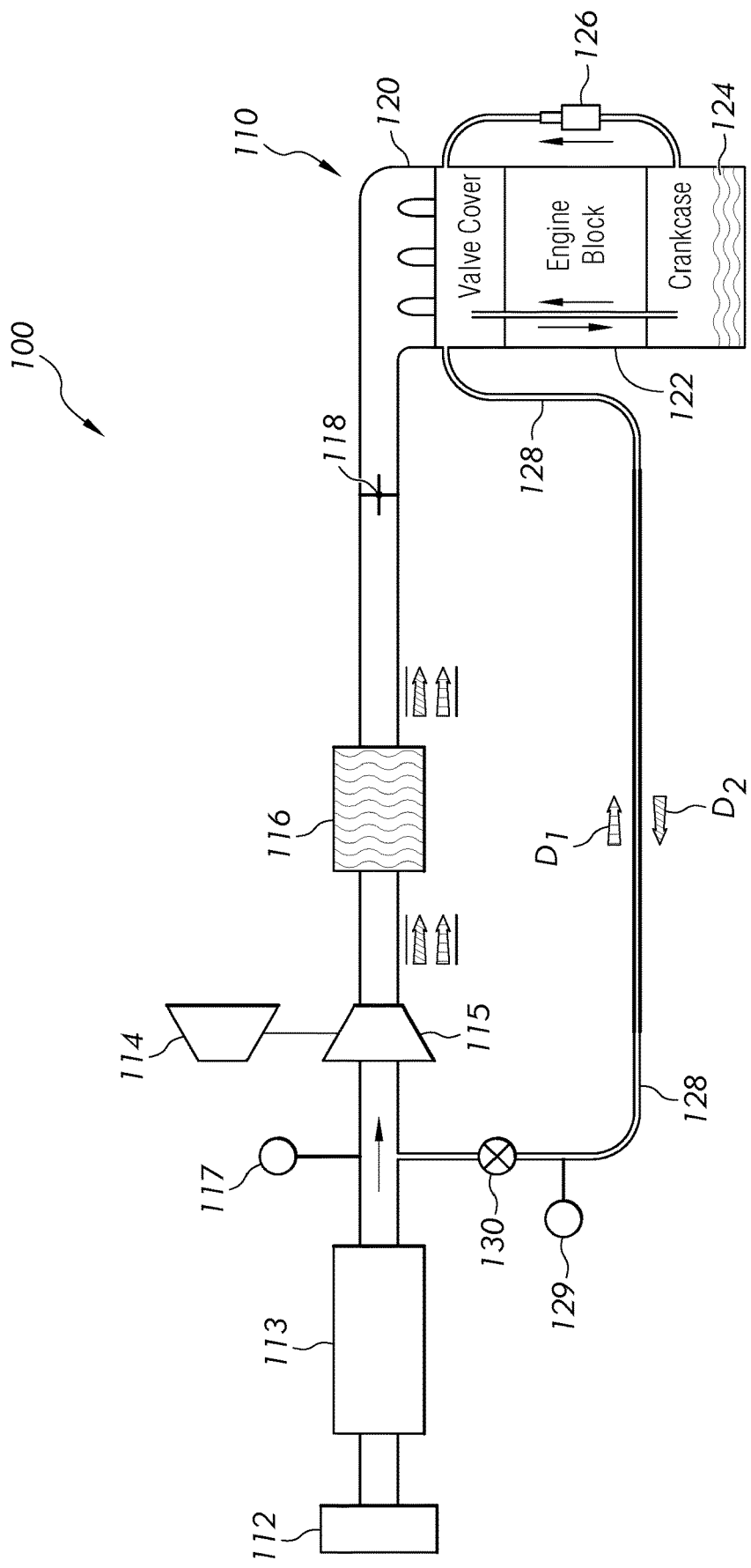
FIG. 1 is a schematic illustration of a turbocharged engine having a crankcase ventilation breach detection system defining a flow control system having three conduit path-ways in parallel, one with a restrictor and the others each with a check valve controlling flow in opposing directions under preselected engine conditions.

The following detailed description will illustrate the general principles of the invention, examples of which are additionally illustrated in the accompanying drawings. In the drawings, like reference numbers indicate identical or functionally similar elements.

As used herein, "fluid" means any liquid, suspension, colloid, gas, plasma, or combinations thereof. In fuel vapor management systems, the fluid is typically a gas when moving through the magnetic latching valve.

As used herein, "key cycle" or "ignition cycle" means an engine start or ignition, followed by engine operation and warm up for a minimum amount of time, and concluded by turning the vehicle off and letting it soak (return to ambient).

FIG. 1 illustrates one embodiment of an engine system 100, which may be a vehicle engine system that is a turbocharged or supercharged system. The engine system 100 is configured for combusting fuel vapor accumulated in at least one component thereof and includes a multi-cylinder internal combustion engine 110. The engine system 100 receives air from an air intake 112, which may include an air filter 113 (also known as an air cleaner). The engine system of FIG. 1 is a turbocharged engine system having a turbocharger 114 but could just as equally be a supercharged engine system or any herein after developed engine system. A pressure sensor 117 can be included to monitor pressure between the air intake 112 and the compressor 115. The compressor 115 of the turbocharger 114 receives air from the air intake 112, compresses the air, and directs a flow of compressed air (or boosted air) downstream through a charge air cooler or intercooler 116 and then to a throttle 118. The throttle 118 controls fluid communication between the compressor 115 and the intake manifold 120 of the engine 110. The throttle 118 is operable using known techniques to vary an amount of intake air provided to the intake manifold 120 and the cylinders of the engine. In alternative embodiments, the intercooler 116 may be positioned downstream of the throttle, and as such, may be housed in the intake manifold.

The intake manifold 120 is configured to supply intake air or an air-fuel mixture to a plurality of combustion chambers of engine 110 located within the engine block 122. The combustion chambers are typically arranged above a lubricant-filled crankcase 124 such that reciprocating pistons of the combustion chambers rotate a crankshaft (not shown) located in the crankcase 124. Unburned fuel and other combustion products may escape past each piston and/or valve guides from the engine block into the crankcase 124. The resulting gases in the crankcase, often referred to as "blow-by" gases may excessively pressurize the crankcase 124 if not vented therefrom. Engine 110 includes a crankcase ventilation system, which serves to vent blow-by gases from the crankcase 124 to intake manifold 120.

Still referring to FIG. 1, the crankcase ventilation system includes a positive crankcase ventilation valve 126 in fluid communication between the crankcase 124 and the intake manifold 120, to regulate the flow of blow-by gases from the crankcase to the intake manifold, and a conduit known as a crankcase ventilation tube 128 placing the crankcase 124, in particular, the blow-by gas in fluid communication with clean air from the air intake 112. Here, the crankcase ventilation tube 128 is in fluid communication upstream of the compressor 115. The crankcase ventilation tube 128 includes a pressure sensor 129 positioned between the crankcase 124 and a make-up air blocking valve 130, which is shown in more detail in FIGS. 2-5. The make-up air blocking valve 130 is positioned between the air duct or air box 113 in the air induction system and the make-up air tube connection to the valve cover of the internal combustion engine 110. In one embodiment, a first port 133 of the make-up air blocking valve 130 is directly connected to the air duct or air box 113, for example, by a spin weld. In one embodiment, the first port 133 comprises a plastic material and, when viewed in a longitudinal cross-section as in FIG. 3, has a generally U-shaped, V-shaped, or J-shaped mouth 133a configured for spin-welding As labeled in FIG. 1, a first direction $D_1$ (when the manifold 120 is in vacuum) is from the air intake upstream of the compressor to the crankcase and the second direction $D_2$ is the opposite of the first direction when the manifold 120 is in boost (is receiving compressed air form the compressor 115 of the turbocharger 114). As shown in FIG. 6, during flow in the first direction $D_1$ a diagnostic can be performed to detect leaks or other failures in the crankcase ventilation system. The diagnostic is performed once per key cycle under idle conditions by moving via a commanded actuator the valve to a restricted flow position (FIG. 4) and monitoring the measurements of the pressure sensors 117 and 129 before the valve is in the restricted flow position (i.e., is in the open position of FIG. 3) and after the valve is moved to the restricted flow position for 1 to 3 seconds to verify the connections are intact. This results in a very low duty cycle for the valve. A detection of no pressure differential by the pressure sensors 117, 129, when the make-up air blocking valve 130 is in a restricted flow position indicates a breach in the system.

Figure 2:
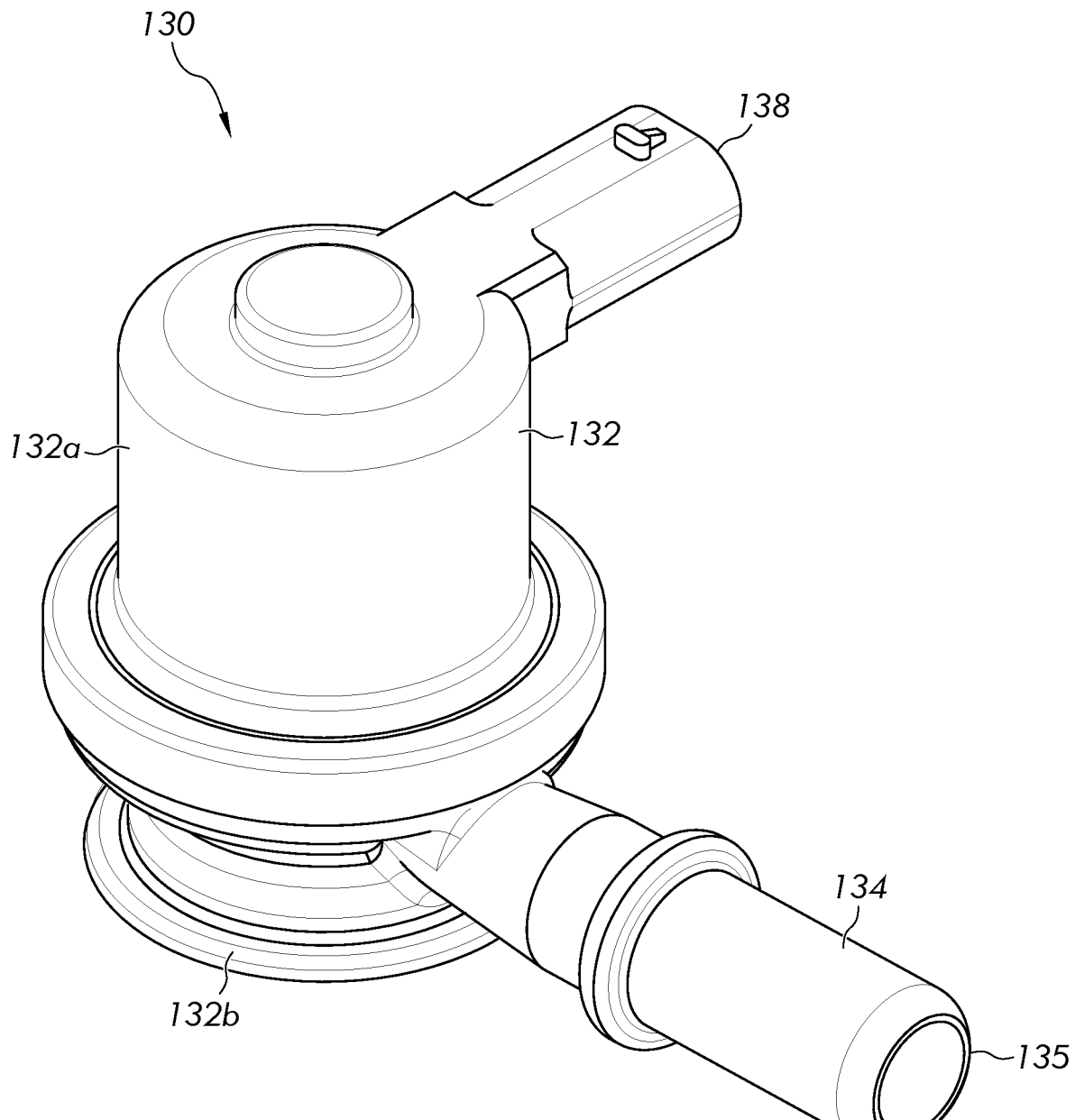
FIG. 2 is a side perspective view of an embodiment of a make-up air blocking valve.
Figure 3:
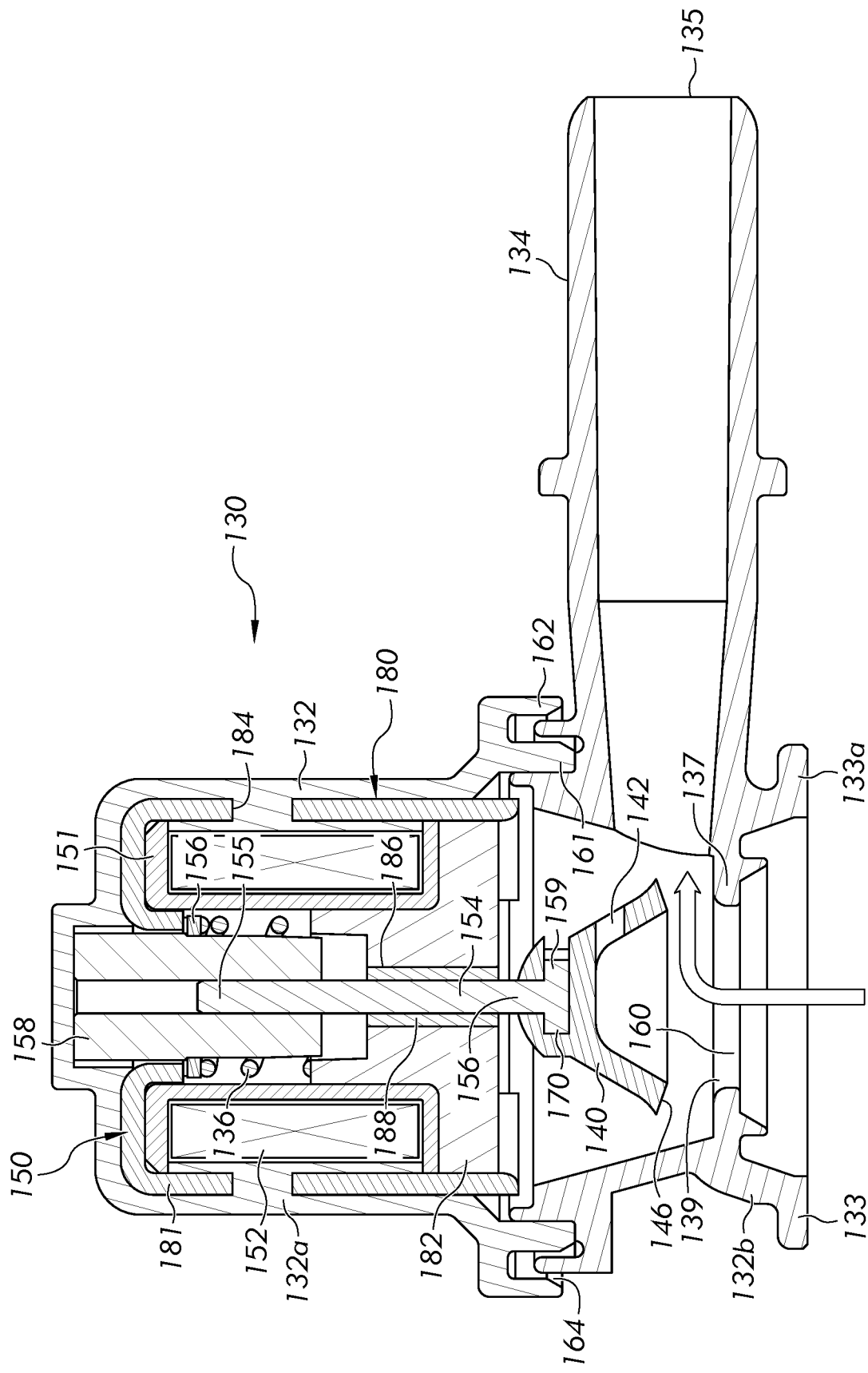
FIG. 3 is a longitudinal, cross-sectional view of the make-up air blocking valve of FIG. 2 in the open, unrestricted flow position.
Figure 4:
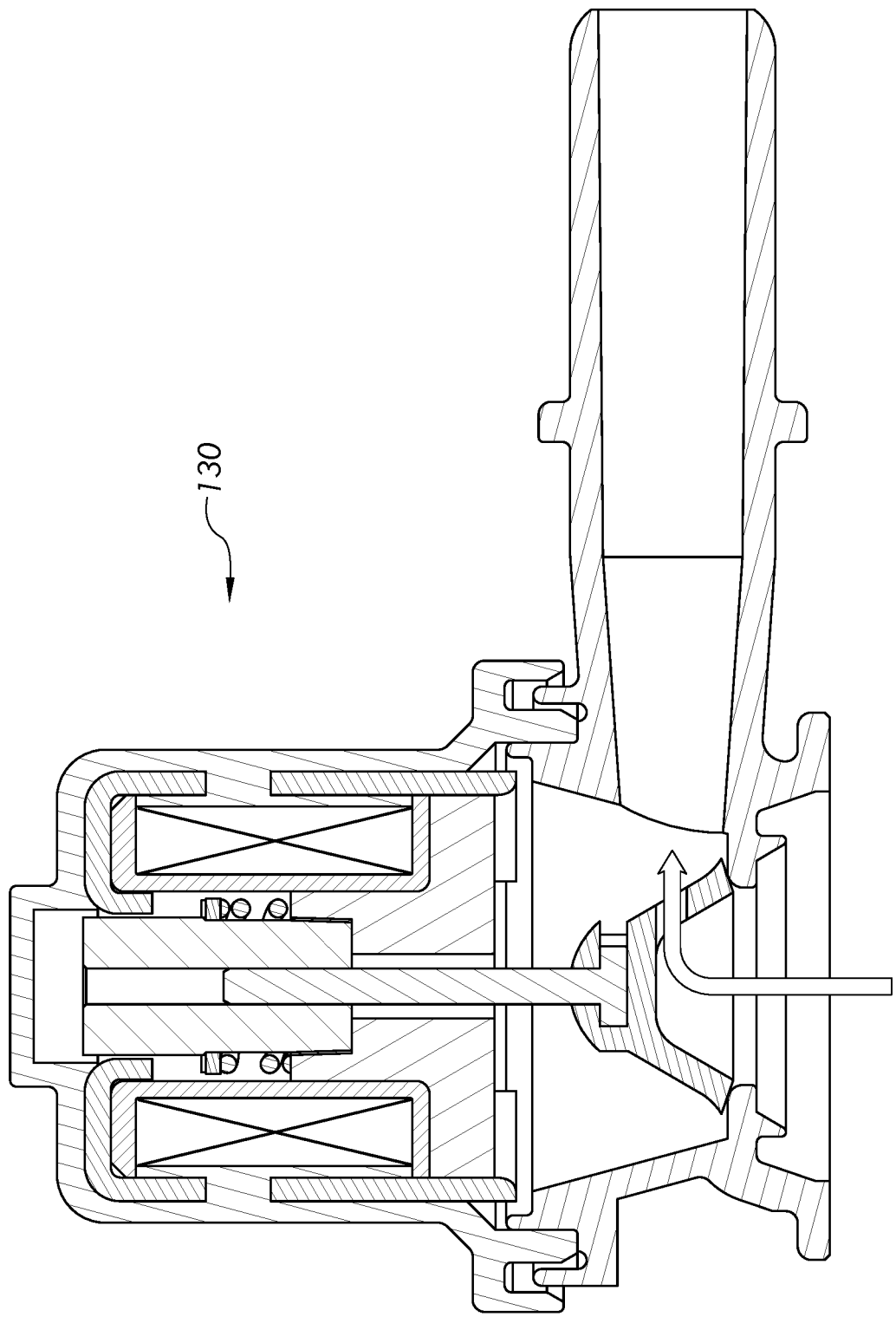
FIG. 4 is a longitudinal, cross-sectional view of the make-up air blocking valve of FIG. 2 in the closed, restricted flow position.

Referring now to FIGS. 2-7, the make-up air blocking valve 130 is a normally open (unrestricted flow position of FIG. 3), commanded closed (restricted flow position of FIG. 4) valve. The make-up air blocking valve 130 has a housing 132 that has a first port 133 and a second port 134 in fluid communication with one another and defining a valve seat 137 therebetween. The second port 134 has an outlet 135 and the valve seat 137 has a preselected radius 139 from inside the housing to the inside of a fluid inlet 160 defined by the housing. The preselected radius 139 is one that provides a seal against a sealing surface 146 of a poppet sealing member 140. The housing 132 is a two-part housing spin-welded together to define a fluid tight housing. One of the housing parts 132a has a mouth 161 configured for spin welding to a second housing part 132b. In one embodiment, the mouth 161 has an annular female fitting 162 defined by spaced apart flanges and the other housing part 132b has an annular male fitting 164 seatable in the annular female member. In FIG. 3, the annular female fitting 162 is shown on the housing part that is over-molded to the solenoid (a plastic material is directly molded to the solenoid in an injection molding, over-molding process), but in other embodiments it could have the annular male fitting. As best seen in FIG. 2, the housing 132 includes a plug or plug receptacle 138 in electrical communication with the solenoid.

Figure 6:
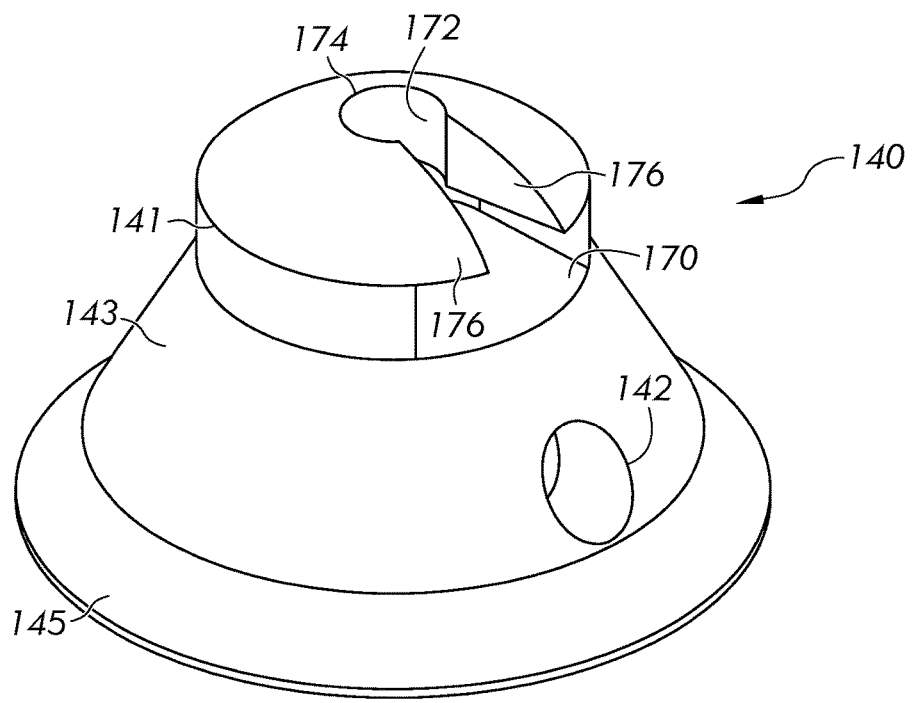
FIG. 6 is an enlarged side, perspective view of the poppet of the make-up air blocking valve of FIG. 2.
Figure 7:
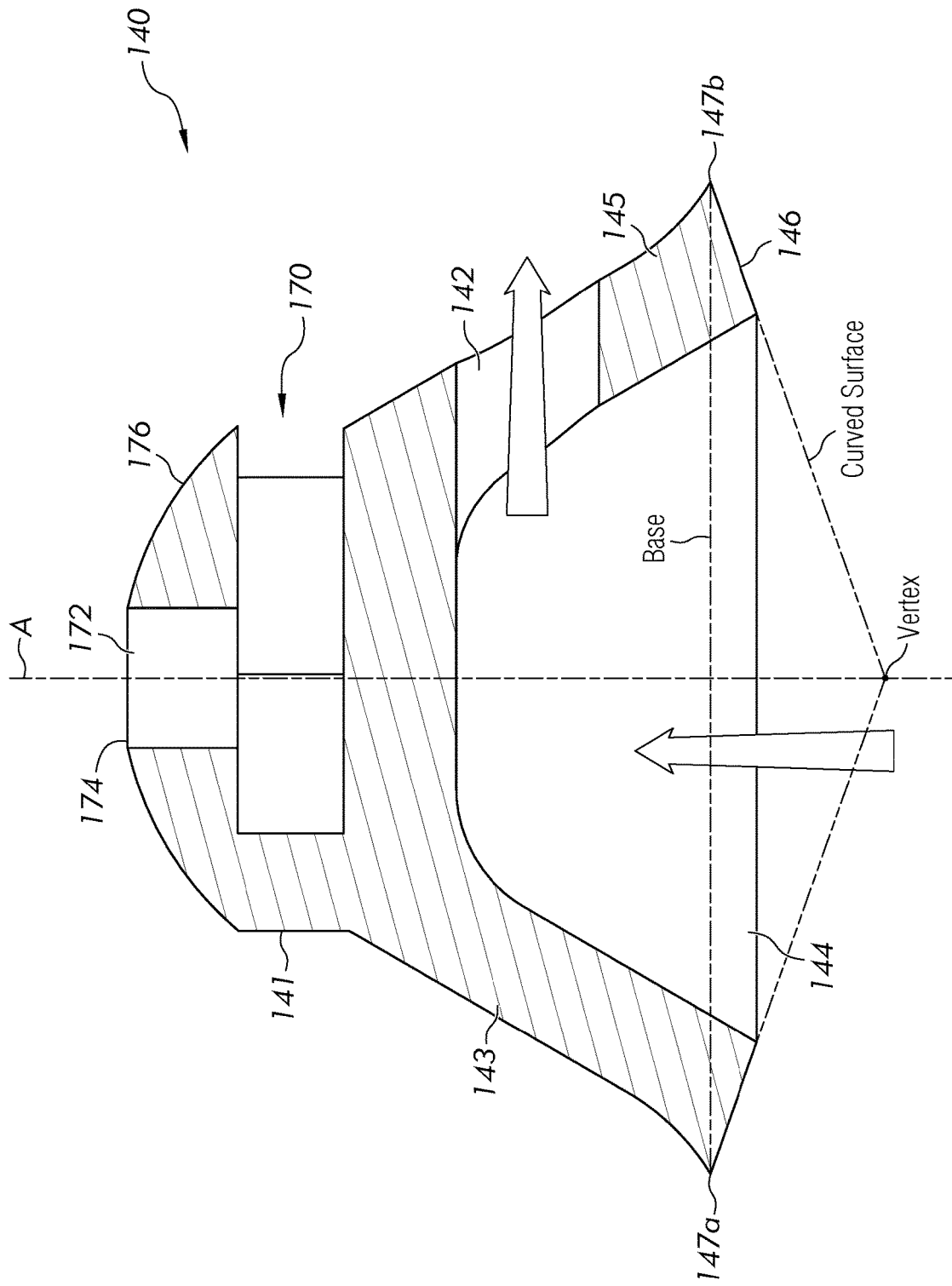
FIG. 7 is a n enlarged cross-sectional view of the poppet from the longitudinal, cross-sectional view of FIG. 3.

The housing 132 encloses a biasing member 136 biasing a poppet sealing member 140 into a normally open, unrestricted flow position shown in FIG. 3. The housing 132 encloses an actuator 150 having a solenoid coil 152 and an armature 158 having a stem 154 fixedly connecting the armature 158 to the poppet sealing member 140. The poppet sealing member 140 is bell-shaped as best seen in FIGS. 6 and 7, thereby having a head 141, a waist 143, and a lip 145, and has an orifice 142 through the waist 143. The orifice 142 defines a restricted flow path through the valve when the poppet sealing member 140 is moved by the actuator to the closed, restricted flow position of FIG. 4. As such, the orifice 142 defines an area that is less than the area available for fluid flow in the open, unrestricted position.

Figure 5:
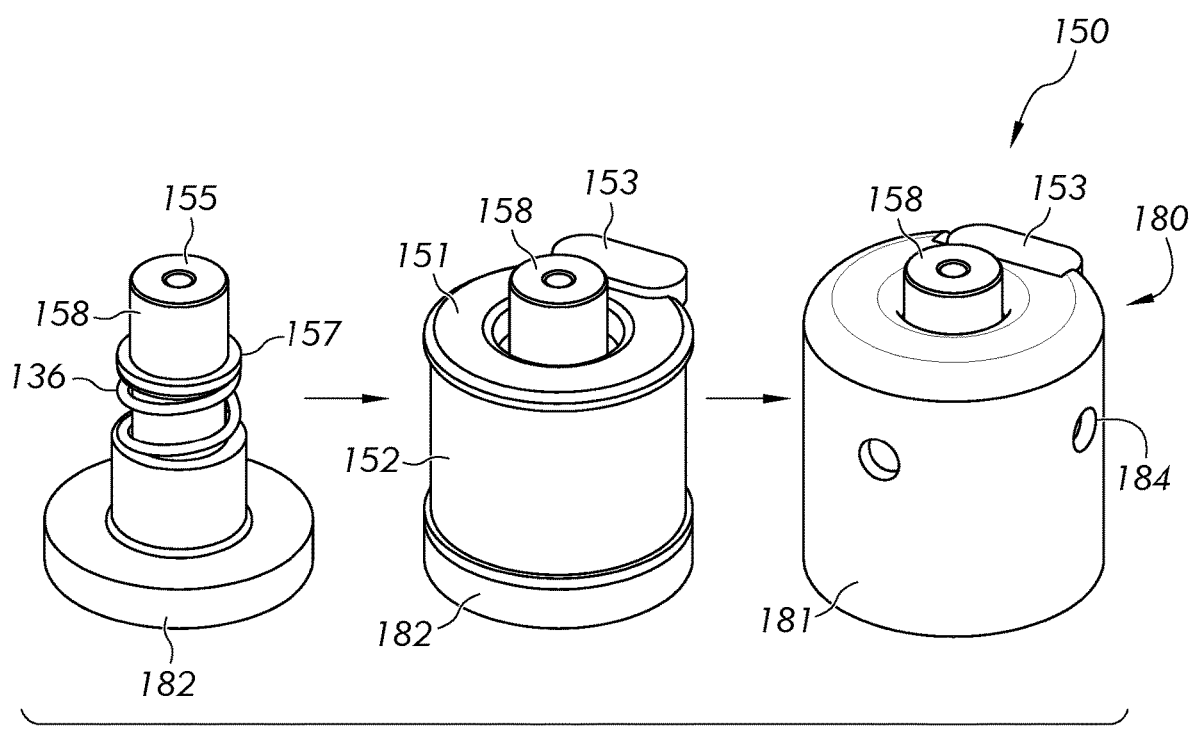
FIG. 5 is an assembly progression of the actuator of the make-up air blocking valve.

Referring back to FIG. 3 and to FIG. 5, the actuator 150 has a casing 180 that includes a plurality of through holes 184 that receive over-molded plastic therethrough to fixedly connect the exterior housing 132 to the actuator 150 and includes a bobbin 151 upon which the solenoid coil 152 is wound and an electrical connector 153 operative connected thereto. An armature 158 is seated inside the solenoid coil 152 and is slidingly movable within the solenoid coil 152. At least a first end 155 of the armature 158 comprises a material that is movable in response to application of an electrical current to the solenoid coil 152. Such material can include, but is not limited to magnetic or paramagnetic material, for example an iron-containing alloy or a ferrite-containing composite material. The second end 156 of the armature 154 is fixedly connected to a stem 154 (FIG. 3) that is connected to the poppet sealing member 140. The connection to the poppet sealing member 140 will be described in more detail with respect to FIGS. 6 and 7 herein.

Still referring to FIGS. 3 and 5, the armature 158 includes a spring abutment member 157 in the outermost surface thereof. In one embodiment, the spring abutment member 157 is an annular washer fixed to the armature 158. In another embodiment, it is a shoulder protruding radially outward from the exterior surface of the armature 158. The biasing element 136 is seated over the armature 158 with a first end against the spring abutment member 157 and a second end operatively connected to a base 182 of a casing 180 that encloses the components of the actuator 150, but has a borehole 186 through which the stem 154 protrudes.

The base 182 of the casing 180 can be a separate piece fixedly connected to a casing body 181 to form the casing 180. A bushing 188 can be seated in the borehole 186. The bushing 186 provides a non-friction surface along which the stem 154 slides and reduces the risk of debris from entering the actuator.

The biasing element 136 can be a coil spring but is not limited thereto. In other embodiments, the biasing element 136 may be a diaphragm or flat spring abutting, or a leaf spring abutting or coupled to the non-insertion end. The coil spring 136 is seated within the housing 132 in a surrounding arrangement about the armature 154, and more particularly, about a guide member 158 in which is received the first end 155 of the armature 154. The biasing element is preferably a compression spring that biases the armature 158 and hence the poppet sealing member away from the valve seat 137.

Turning now to FIGS. 6 and 7, the poppet sealing member 140 is shown enlarged. The poppet sealing member 140 has a head 141, waist 143 and lip 145. As noted above, the orifice 142 that defines the restriction on the flow is through the waist 143 of the bell-shaped poppet sealing member 140. The orifice 142 is typically oriented perpendicular to a central longitudinal axis (A) of the poppet sealing member 140 and is positioned to face the second port 134. The lip 145 defines a mouth 144 of the poppet sealing member 140 and has a bottom sealing surface 146. The bottom sealing surface 146 is conically-shaped and is oriented radially outward and upward relative to the head 141 of the poppet sealing member 140. As such, the bottom sealing surface 146 is part of a curved surface of a cone that, when viewed in a longitudinal cross-section of the valve, has a base extending from a left terminus 147a to a right terminus 147b of the lip 145 and has a vertex positioned below the mouth of the poppet sealing member as depicted in FIG. 7. The angle formed between the base and the curved surface is in a range of 10 to 50 degrees.

Referring first to FIG. 3 and then to FIGS. 6 and 7, the second end 156 of the armature 154 terminates with an enlarged, plate-like head 159. The head 141 of the poppet sealing member 140 includes a socket 170 that opens into an upward hole 172 at the crown 174 that is sized to receive the armature 154 most proximate the plate-like head 159. The socket 170 includes a clip-like feature 176 that snaps around the armature 154 after having passed therethrough and received in the upward hole 172.

Referring now to FIGS. 6 and 7, the orifice 142 is typically circular or elliptical in shape but can be square or rectangularly-shaped. The diameter of the orifice can be in a range of about 1 mm to 5 mm, more typically about 1.5 mm to about 3 mm. For the diameter, "about" means+/−0.1 mm. The orifice 142 has an area that is dimensioned to allow a precise, pre-selected flow at given pressure differential. The pressure differential can vary depending upon the selected internal combustion engine and its configuration. In one embodiment, the pressure differential is 2 kPa and the preselected flow is 14.8 liters per minute (LPM). The orifice 142 is positioned in the waist of the bell-shaped poppet, such that the orifice above the sealing surface, which provides consistent flow therethrough with each diagnostic cycle run therewith. In other words, any variation in the seating of the sealing surface 146 against the valve seat 137 in any particular diagnostic cycle does not affect the orifice 142 nor the restriction of flow provided thereby.

The system 100, including the make-up air blocking valve 130, is useful in a method of on-board diagnostic leak detection for a crankcase ventilation system. The method includes providing a crankcase ventilation system with the make-up air blocking valve 130 positioned as described herein, commanding the valve 130 to move the poppet sealing member to the restricted flow position shown in FIG. 4 for a pre-selected time period, monitoring the measurements from pressure sensors, positioned as described herein, before and during the pre-selected time period, and comparing the before and during measurements for detection of a leak in the system. The pre-selected time period is 1 to 3 seconds. The method also includes stopping the commanding of the valve so that the biasing member can move the poppet sealing member 140 to the unrestricted flow position shown in FIG. 3.

Figure 8:
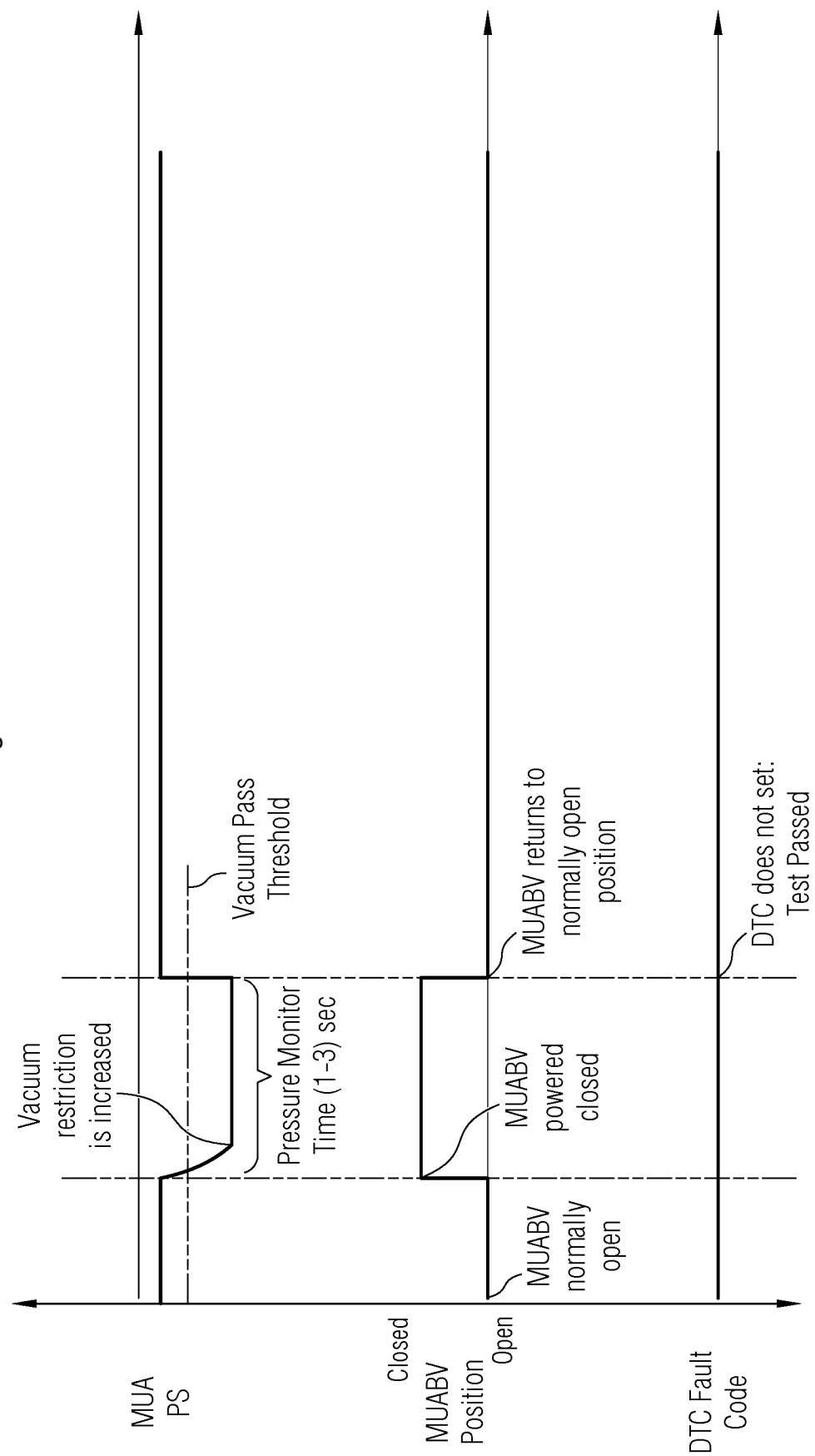
FIG. 8 is a first graph of diagnostic pressures while the system is in vacuum.
Figure 9:
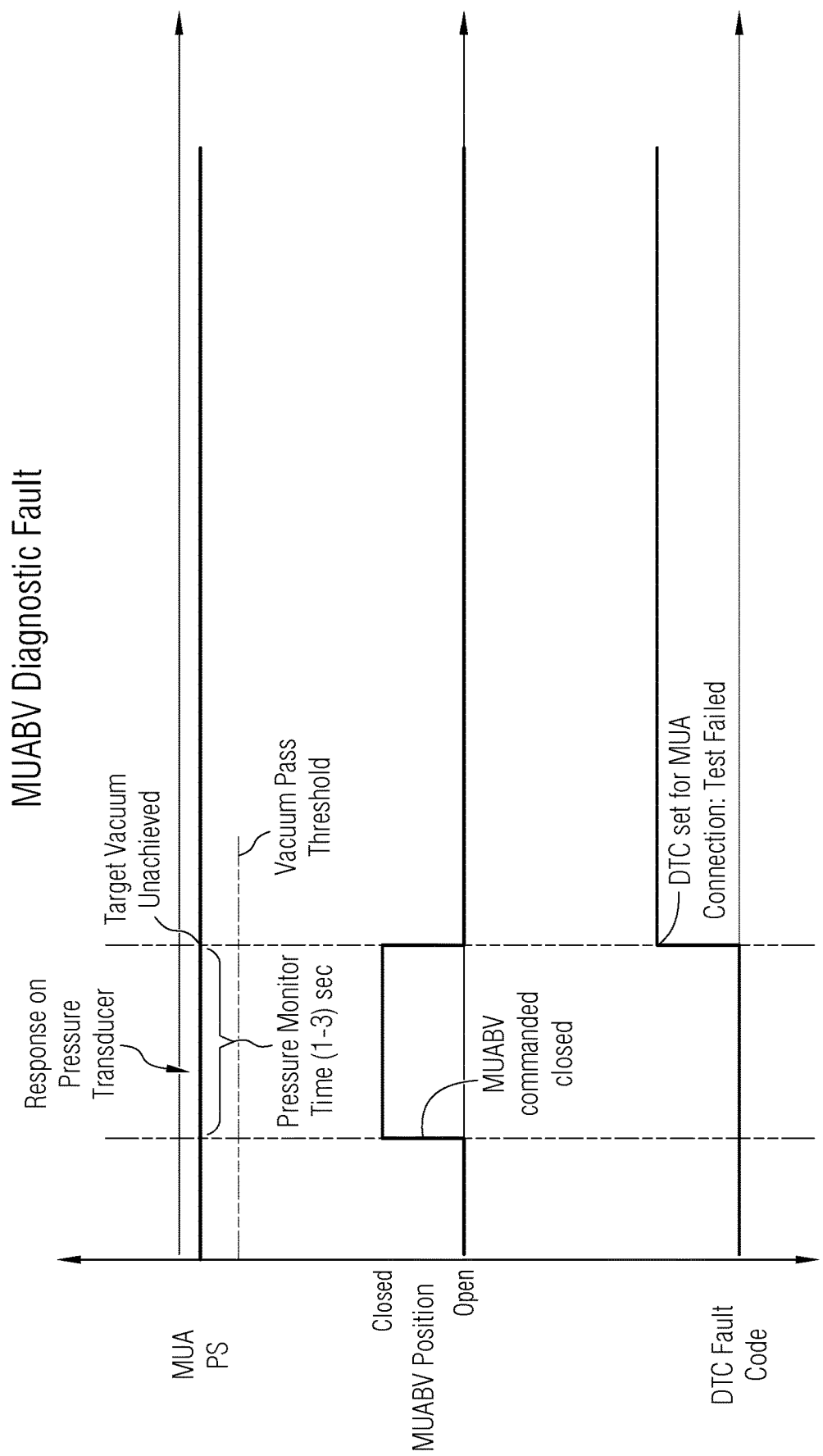
FIG. 9 is second graph of diagnostic pressure showing a "fault" detected in the system.

A diagnostic graph is shown in FIG. 8 in which the valve is commanded closed during flow while the system is in vacuum (flow in the direction of $D_1$ in FIG. 1). In FIG. 8, the diagnostic test resulted in a passed test, no leak detected. In contrast, in FIG. 9, a leak was detected. In both graphs DTC stands for Diagnostic Trouble Code. The powertrain control module (PCM) or any other on-board microchip or controller stores the DTC for self-diagnosing the existence of a fault or failure in the system, such as a leak disconnected lines, or breaks in the crankcase ventilation system, and signals when such a fault or failure occurs.

A method of assembly includes over-molding a plastic material to a solenoid actuator to form a first housing part, connecting the poppet sealing member to the armature of the solenoid actuator, mating the spin-weld fitting of the first housing part to a second housing part, and spin welding the two housing parts to one another. With reference to FIG. 5, the method may include assembling the solenoid actuator, which includes fixing a spring abutment 157 to the armature 158 or providing an armature 158 having a spring abutment feature 157, seating a spring 136 over the armature 158 with a first end of the spring 136 against the spring abutment 157, connecting a base 182 of a casing 180 to the second end of the spring 136, wherein the base 182 has a borehole therethrough through which the stem is linearly translatable, seating a bobbin 161 over the armature 158, winding a solenoid coil 152 on the bobbin 151, connecting the solenoid coil 152 to an electrical connector 153, and seating a casing body 181 over the components of the solenoid. The second housing part defines the first port, the second port, and a valve seal for the poppet sealing member. Either of the first housing part or the second housing part can be held stationary while the other is rotated relative thereto, with the application of pressure, 360 degrees or more to weld the components together. At least the spin-weld fitting of the second housing part also comprises a plastic material. The plastic material is typically a thermoplastic material that melts and becomes welded together as a result of the pressure and friction created by rotating one component relative to the other. The spin welding may include providing a stationary jig shaped and configured to hold either housing part and an opposing jig or chuck that is rotatable relative to the stationary jig.

Advantages of the make-up air blocking valve 130 include smaller size, reduced manufacturing costs, and reduced weight over other commercially available valves, and more reliability/reproducible results from the poppet sealing member. The spin-weld directly to the airbox 113 or the air duct eliminates additional conduit and multiple connection points produced thereby that could be a potential leak point.

It should be noted that the embodiments are not limited in their application or use to the details of construction and arrangement of parts and steps illustrated in the drawings and description. Features of the illustrative embodiments, constructions, and variants may be implemented or incorporated in other embodiments, constructions, variants, and modifications, and may be practiced or carried out in various ways. Furthermore, unless otherwise indicated, the terms and expressions employed herein have been chosen for the purpose of describing the illustrative embodiments of the present invention for the convenience of the reader and are not for the purpose of limiting the invention.

Having described the invention in detail and by reference to preferred embodiments thereof, it will be apparent that modifications and variations are possible without departing from the scope of the invention which is defined in the appended claims.

What is claimed is:

1. A valve comprising:
    a housing defining a first port and a second port in fluid communication with one another and defining a valve seat therebetween;
    a biasing member biasing a poppet sealing member into a normally open position, thereby defining unrestricted flow through the valve, wherein the poppet sealing member comprises an orifice therethrough defining a restricted flow path through the valve;
    a commanded actuator connected to the poppet sealing member;
    wherein, upon command, the commanded actuator is configured to move the poppet sealing member from the open position to a restricted flow position in which the poppet sealing member is seated against the valve seat in a closed position;
    wherein, in the closed position, the orifice in the poppet sealing valve provides for restricted flow via the restricted flow path from the first port thorough the orifice in the poppet sealing member to the second port.

2. The valve of claim 1, wherein the commanded actuator comprises a solenoid housed within the housing and the housing defines a plug or plug receptacle in electrical communication with the solenoid.

3. The valve of claim 1, wherein the wherein the biasing member is a coil spring.

4. The valve of claim 1, wherein the poppet sealing member is bell-shaped.

5. The valve of claim 4, wherein the poppet sealing member has a bottom sealing surface defining a mouth of the bell-shaped poppet sealing member, and the bottom sealing surface is a curved surface of a cone, when viewed in a longitudinal cross-section of the valve, oriented radially upward and outward relative to a head of the poppet sealing member.

6. The valve of claim 5, wherein the orifice is oriented perpendicular to the central longitudinal axis of the poppet sealing member.

7. The valve of claim 5, wherein the orifice is positioned to face the second port.

8. The valve of claim 1, wherein the first port comprises a plastic material and, when viewed in a longitudinal cross-section, comprises a generally U-shaped, V-shaped, or J-shaped mouth configured for spin-welding.

9. The valve of claim 1, wherein the housing is a two-part housing spin-welded together.

10. The valve of claim 9, wherein the commanded actuator comprises a solenoid and the solenoid is over-molded with a plastic material that defines a first housing part of the two-part housing.

11. The valve of claim 10, wherein the first housing part has a mouth configured for spin welding to a second housing part of the two-part housing.

12. A crankcase ventilation breach detection system of an internal combustion engine comprising:
    an internal combustion engine having a crankcase and an intake manifold;
    a crankcase ventilation tube in fluid communication with air from an air intake and the blow-by-gas;
    a valve according to claim 1 controlling fluid flow through the crankcase ventilation tube; and
    a pressure sensor positioned between the valve and the crankcase, wherein detection of no pressure differential by the pressure sensor during restricted flow through the valve indicates a breach in the system.

13. The system of claim 12, comprising a positive crankcase ventilation valve in fluid communication between the crankcase and intake manifold to regulate the flow of blow-by-gas from the crankcase to the intake manifold.

14. The system of claim 12, wherein the internal combustion engine has a turbocharger and the crankcase ventilation tube connects upstream of the compressor of turbocharger.

15. The system of claim 1, wherein the valve is commanded to move to the restricted flow position once per key cycle under idle conditions of the internal combustion engine.

16. A method of on-board diagnostic leak detection for a crankcase ventilation system;
providing a system according to claim 12;
commanding the valve to move the poppet sealing member to the restricted flow position for a pre-selected time period;
monitoring measurements from the pressure sensor before and during the pre-selected time period;
comparing the before and during measurements for detection of a leak in the system.

17. The method of claim 16, further comprising stopping the commanding step and allowing the biasing member to move the poppet sealing member to the unrestricted flow position.

18. A valve comprising:
a housing defining an inlet port and an outlet port in fluid communication with one another and defining a valve seat therebetween;
a bell-shaped poppet sealing member seated within the housing, wherein the bell-shaped sealing member defines and orifice passing therethrough and has a bottom sealing surface defining a mouth thereof, and the bottom sealing surface when viewed in a longitudinal cross-section of the valve is a curved surface of a cone oriented radially upward and outward relative to a head of the poppet sealing member;
a biasing member biasing the bell-shaped poppet sealing member into a normally open position;
a commanded actuator connected to the bell-shaped poppet sealing member;
wherein the commanded actuator is configured to move the bell-shaped poppet sealing member upon command from the open position to a closed position in which the bell-shaped poppet sealing member is seated against the valve seat;
wherein, in the closed position, the orifice in the bell-shaped poppet sealing member defines a restricted flow path from the inlet port through the bell-shaped poppet sealing member to the outlet port.

* * * * *